June 27, 1961
G. S. SOLT
2,990,361
ELECTRODIALYTIC CELLS
Filed Nov. 17, 1958
3 Sheets-Sheet 1
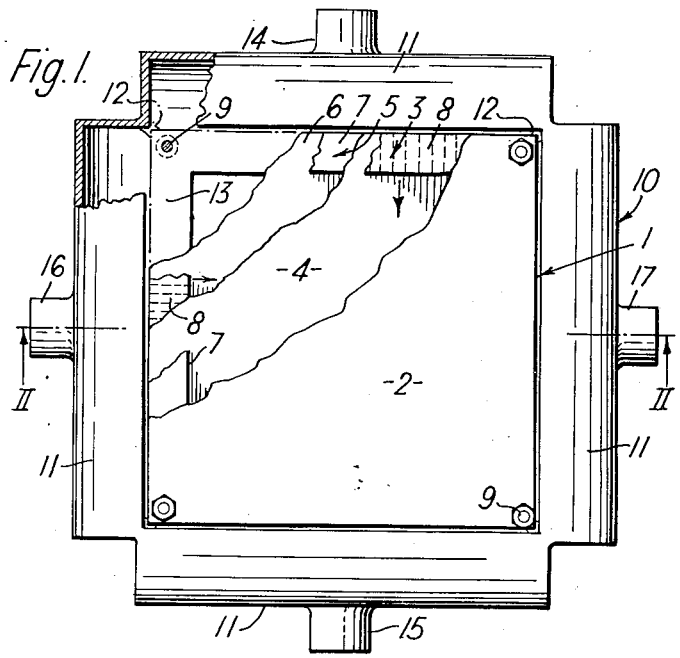
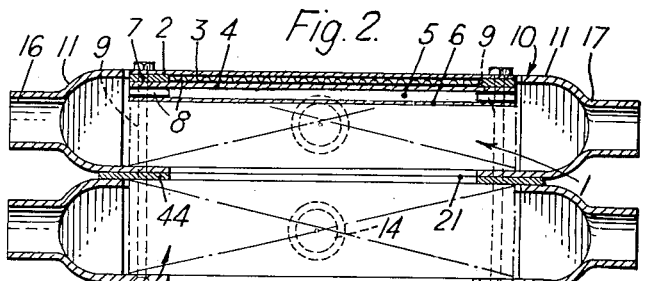
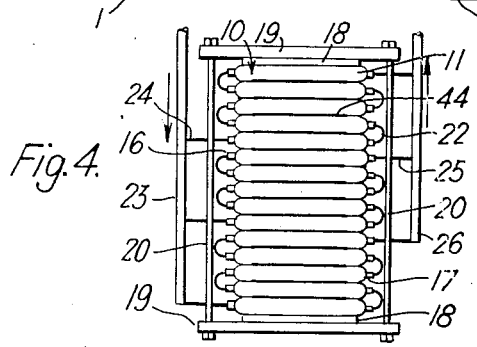
Inventor
George Stefan Solt
By Bailey, Stephens & Huettig
Attorneys

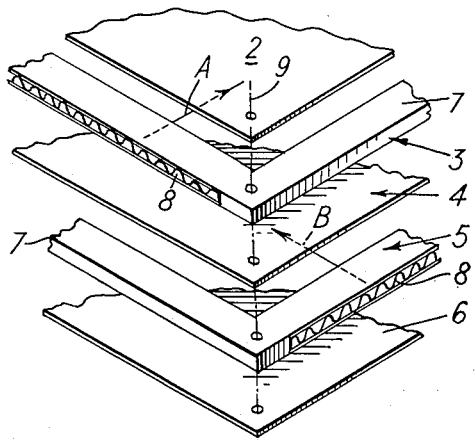
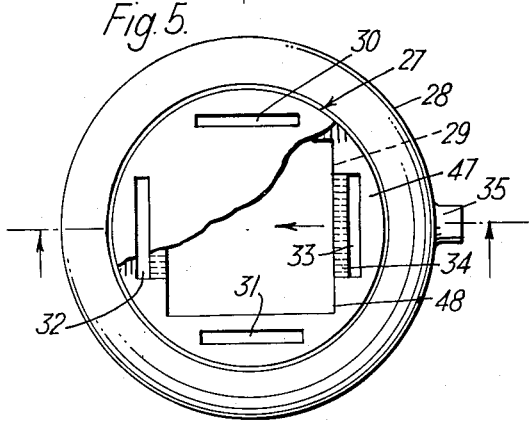
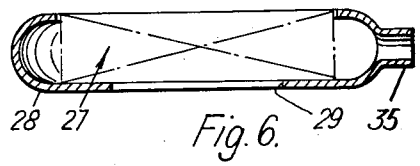

June 27, 1961 G. S. SOLT 2,990,361
ELECTRODIALYTIC CELLS
Filed Nov. 17, 1958 3 Sheets-Sheet 3
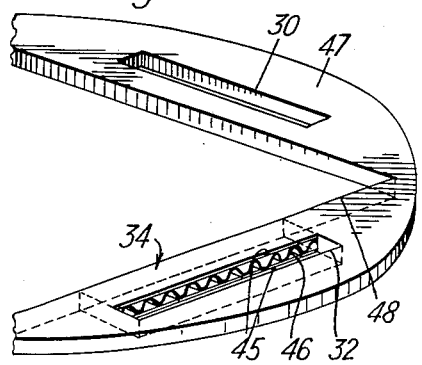
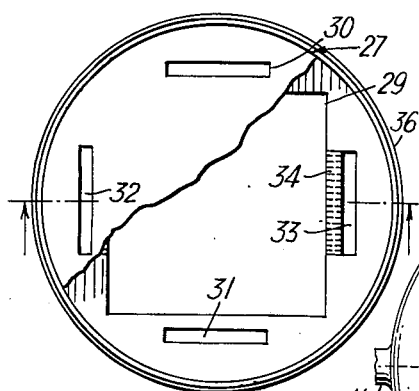
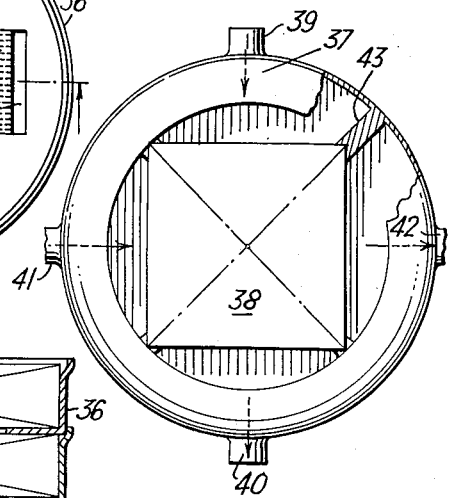
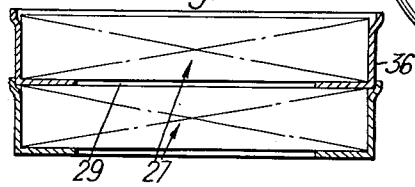
Inventor
George Stefan Solt
By
Bailey, Stephens & Huettig
Attorneys

United States Patent Office 2,990,361
Patented June 27, 1961

2,990,361
ELECTRODIALYTIC CELLS
George Stefan Solt, London, England, assignor to
The Permutit Company Limited
Filed Nov. 17, 1958, Ser. No. 774,336
Claims priority, application Great Britain Nov. 25, 1957
7 Claims. (Cl. 204—301)

This invention relates to that kind of electrodialytic cell in which compartments are formed between adjacent ion-selective membranes spaced apart from one another by gaskets or by insulating projections, and liquids flow through these compartments while an electric current is passed through the whole cell. The number of membranes and compartments in the cell may be large, e.g. several hundred, and this gives rise to various difficulties. For instance, the assembly of membranes tends to deform as a whole under the pressure existing during operation; it is difficult to locate a faulty membrane; and it is impossible to take part of the cell out of service for maintenance.

The object of this invention is to provide a cell in which these drawbacks are wholly or largely avoided.

This object is attained according to the invention by building up the cell from pre-assembled units each comprising a frame holding a stack of membranes spaced apart from one another to form compartments, the frames having open centres such that an additional compartment is formed where two frames meet when the units are assembled together and accordingly there is a continuous electric path through the cell when liquid is present in all the compartments.

The invention will be more clearly understood from the following description of some constructions according to the invention, taken in conjunction with the accompanying diagrammatic drawings, in which:

FIGURE 1 is a plan of one unit partly cut away to expose successive membranes and gaskets;
FIGURE 2 is a section on the line II–II in FIGURE 1 and also shows a second unit on the first;
FIGURE 3 is an exploded view showing the arrangement of membranes and gaskets in the unit;
FIGURE 4 shows a cell formed from such units;
FIGURE 5 is a plan of another unit;
FIGURE 6 is a section through this unit;
FIGURE 7 shows part of one gasket on a larger scale;
FIGURES 8 and 9 are views, similar to FIGURES 1 and 2, of another construction; and
FIGURE 10 shows yet another unit in plan.

The unit shown in FIGURES 1 and 2 comprises a stack 1 of square membranes separated from one another by gaskets. The precise arrangement of the membranes and gaskets may vary as required in the cell, but one suitable arrangement is shown in FIGURES 2 and 3. In these a cation-selective membrane 2 lies above a gasket 3, and anion-selective membrane 4, a gasket 5, a cation-selective membrane 6 and so on. Each gasket is composed of two liquid-impermeable strips 7 extending along opposite sides and of passage-forming strips 8 extending along the connecting walls, and successive gaskets are turned through 90° relative to one another. Thus in the compartment formed between the membranes 2 and 4 liquid can flow in the direction of the arrow A through the strip 8 and out through the corresponding strip on the other side of the compartment; and in the compartment formed between the membranes 4 and 6 the flow is in the direction of the arrow B.

At each corner each membrane and each gasket has a hole for the reception of a bolt 9 of electrically non-conducting material.

The frame of the unit is a moulding 10 of a non-conducting and slightly flexible material such as semi-hard rubber or a polyester resin reinforced by glass fibers. This moulding consists essentially of four sides 11, each nearly semi-circular in cross-section, united at their end edges 12. Each side 11 extends far enough inwards at one face to underlap the stack 1 inserted in it, as shown at 13. Holes are made in this face for the bolts 9 and are countersunk to receive the bolt heads. At the opposite face each side 11 stops short of the stack 1. Connections 14 and 15 for the supply and discharge of one liquid are made in opposite sides 11, and similar connections 16 and 17 are made in the two remaining sides.

To form a cell such units are put one on top of another with a soft gasket 44 between adjacent units. The assembly of units is arranged between electrodes 18 and then subjected to external compression. The pressure may be applied, as shown in FIGURE 4, by end plates 19 urged together by bolts 20, or in any other way, the method of applying pressure being no part of this invention. In operation a direct electric current is passed through the cell from one electrode to the other.

By reason of the shape of the frames, internal liquid pressure serves to increase the seal between adjacent units.

It will be seen from FIGURE 2 that an additional compartment 21 is formed between adjacent units when these are assembled together and is as wide as the combined thickness of frame and gasket. To reduce the electrical resistance across this compartment 21 the membrane stacks should be assembled so that the liquid flowing in this compartment is that which has the higher electrolyte concentration.

FIGURE 4 shows one suitable way of joining up the supply and discharge connections 16 and 17. The units are arranged in batches of five, the liquid flow through all the units of a batch being in series by virtue of connecting pipes 22. The flow of the liquid through the batches is in parallel, a main feed pipe 23 having branches 24 leading to the various batches, and similar branch pipes 25 leading to a discharge manifold 26.

It will be appreciated that each side 11 of the frame constitutes either a supply header or a discharge manifold for half the compartments in the unit. There may be, for instance, twenty pairs of membrane in each stack, so that each liquid flows in parallel through twenty compartments. It is necessary to ensure that the supply headers and discharge manifolds are sealed off from one another at the corners 12, and the seals must be made after the stack 1 has been put in position.

The sealing difficulty can be avoided by the construction shown in FIGURES 5 and 6. Here the units are circular with circular membranes forming stacks 27. The frames are shown at 28 and have square openings 29, so that the membrane area actually utilised is square. Externally circular gaskets 47 are used and have square openings 48 which register in the stack with the openings 29. In each membrane and gasket ports 30 and 31 for one liquid and 32 and 33 for the other are made outside this square membrane area. In each gasket in the stack, the material of the gasket adjacent the inner edge of each of two opposite ports is removed to leave a slot which receives a passage-forming insert 34, whereas the ports forming the other pair are simply rectangular openings in the material of the gasket, as are all the ports in the membranes. The membrane and gasket ports register with one another to form continuous passages through the stack for the axial flow of the liquids, and it will readily be seen that as each liquid flows through one of these passages some of it will leave the passage through an insert 34 to flow transversely through every alternate compartment and out through the opposite insert 34.

A passage-forming insert 34 in a gasket is shown on a larger scale in FIGURE 7. It consists of two strips of plastic 45 embracing and bounding a corrugated plastic strip 46 so that channels extending from the port 32 to the edge of the opening 48 are made. This insert acts as part of the gasket and may be united to the remainder in any convenient way or may be merely let into the slot made to receive it in the inner edge of this gasket.

The frame 28 is formed with connections 35 through which a liquid can be introduced under pressure to provide hydraulic support for the membrane stack. This arrangement, though simple, is wasteful of space and membrane area. Another method of achieving the same object is shown in FIGURES 8 and 9, where the stack 27 fits closely inside a frame 36.

Another unit is shown in FIGURE 10, where a circular frame 37 holds a square membrane stack 38. Liquid connections 39 to 42, similar to 16 to 19, are provided, the segments outside the stack acting as headers and manifolds. Seals 43 are provided at the corners of the stack.

I claim:

1. An electrodialysis cell comprising end electrodes and a plurality of units assembled between said electrodes, each unit comprising a hollow frame having openings in the walls of its opposite faces, one of said openings being larger than the other, a stack within the frame composed of a plurality of ion-selective membranes having spacing means therebetween to form a number of compartments, said membranes being larger than the smaller of the openings but no larger than the larger opening and resting on the inside of the wall around the smaller opening, so that an additional compartment is formed where two frames meet when the units are assembled together, whereby a continuous electric path is provided through the cell from one electrode to the other when liquid is present in all the compartments, said frames having connections for the supply and discharge of liquids to and from said compartments.

2. A cell as claimed in claim 1 in which the connections to each frame are through the compartments in it independently of any other frame.

3. A cell as claimed in claim 1 in which each stack comprises gaskets alternating with the membranes and formed partly by liquid-impermeable material and partly by a passage-forming insert means.

4. A cell as claimed in claim 3 in which ports for axial flow of liquid are made in parts of the membranes and gaskets lying outside the open centres of the frame and communicate with the compartments by passage-forming material of the gaskets.

5. A cell as claimed in claim 4 in which the frames and stacks are circular, the open centres are rectangular and the ports are rectangular and arranged in pairs, the ports of one pair being parallel to one side of the open centre and those of the other pair being parallel to the other side of the open centre.

6. A cell as claimed in claim 1 in which each frame consists essentially of four sides, each nearly semi-circular in cross-section, united at their end edges, each side extending far enough inwards at one face to underlap a stack inserted in it.

7. A cell as claimed in claim 1 in which the frames are circular and the stacks are square, seals being made at the corners of the stacks with the frames, and the segments within the frames outside the stack form headers and manifolds for liquids flowing through the cell.

References Cited in the file of this patent

UNITED STATES PATENTS

| | | |
|---|---|---|
| 196,254 | Schering | Oct. 16, 1877 |
| 1,719,754 | Cerini | July 2, 1929 |
| 1,845,316 | Michailovsky | Feb. 16, 1932 |
| 2,758,083 | Van Hoek et al. | Aug. 7, 1956 |
| 2,799,644 | Kollsman | July 16, 1957 |
| 2,848,403 | Rosenberg | Aug. 19, 1958 |
| 2,894,894 | Kressman et al. | July 14, 1959 |

FOREIGN PATENTS

| | | |
|---|---|---|
| 371,837 | Great Britain | Apr. 25, 1932 |